United States Patent [19]

Johnson et al.

[11] 4,160,589
[45] Jul. 10, 1979

[54] COMBINED SOLENOID AND TIMING SYSTEM FOR SLR CAMERA APPARATUS

[75] Inventors: Bruce K. Johnson, Andover; George D. Whiteside, Lexington, both of Mass.

[73] Assignee: Polaroid Corporation, Cambridge, Mass.

[21] Appl. No.: 883,186

[22] Filed: Mar. 3, 1978

[51] Int. Cl.² ............................................. G03B 17/50
[52] U.S. Cl. ..................................... 354/86; 354/150; 354/153; 354/234
[58] Field of Search ................... 354/83, 86, 150, 152, 354/153, 158, 230, 234, 235

[56] References Cited

U.S. PATENT DOCUMENTS 3,714,879  2/1973  Land et al. ............................ 354/83
4,017,876  4/1977  Coughlan et al. .................... 354/230

FOREIGN PATENT DOCUMENTS 971795  7/1975  Canada ................................... 354/235

Primary Examiner—John Gonzales
Attorney, Agent, or Firm—Edward S. Roman

[57] ABSTRACT

A single lens reflex photographic camera for use with self-developing film units is automatically controlled to perform a plurality of photographic related functions in a select sequence. The camera includes a movable reflex mirror, a shutter blade mechanism and a film advancement and processing apparatus, all of which are automatically controlled, primarily by mechanical apparatus, to perform their respective functions in the select sequence in response to the actuation of a single photographic cycle initiating button.

14 Claims, 9 Drawing Figures

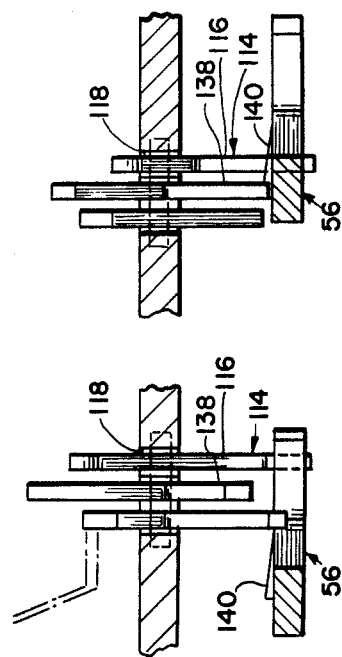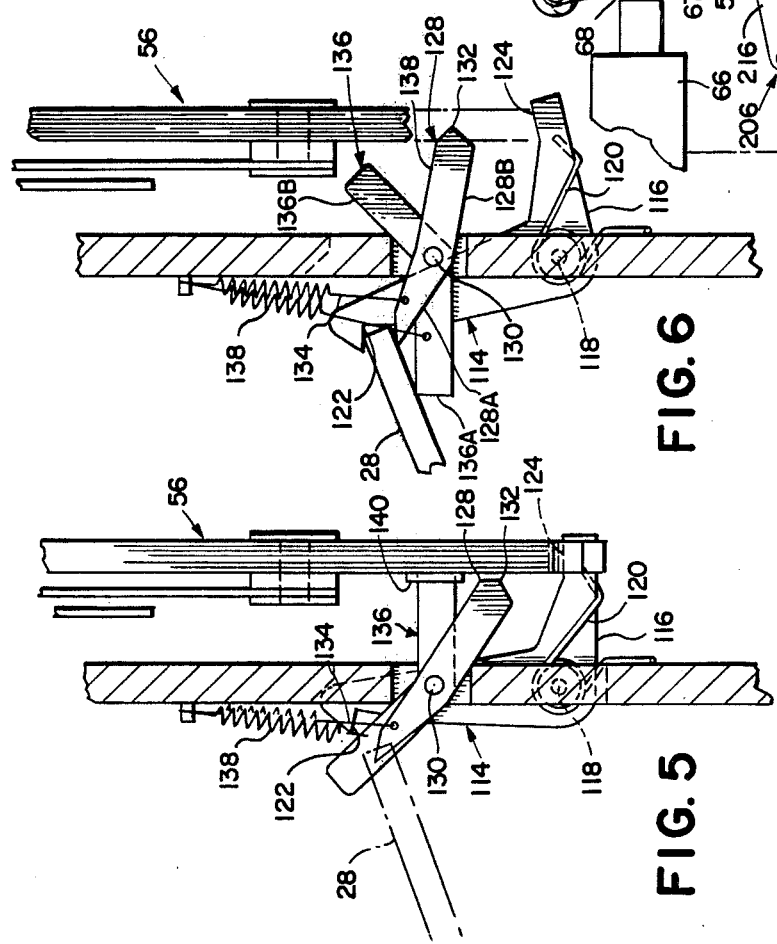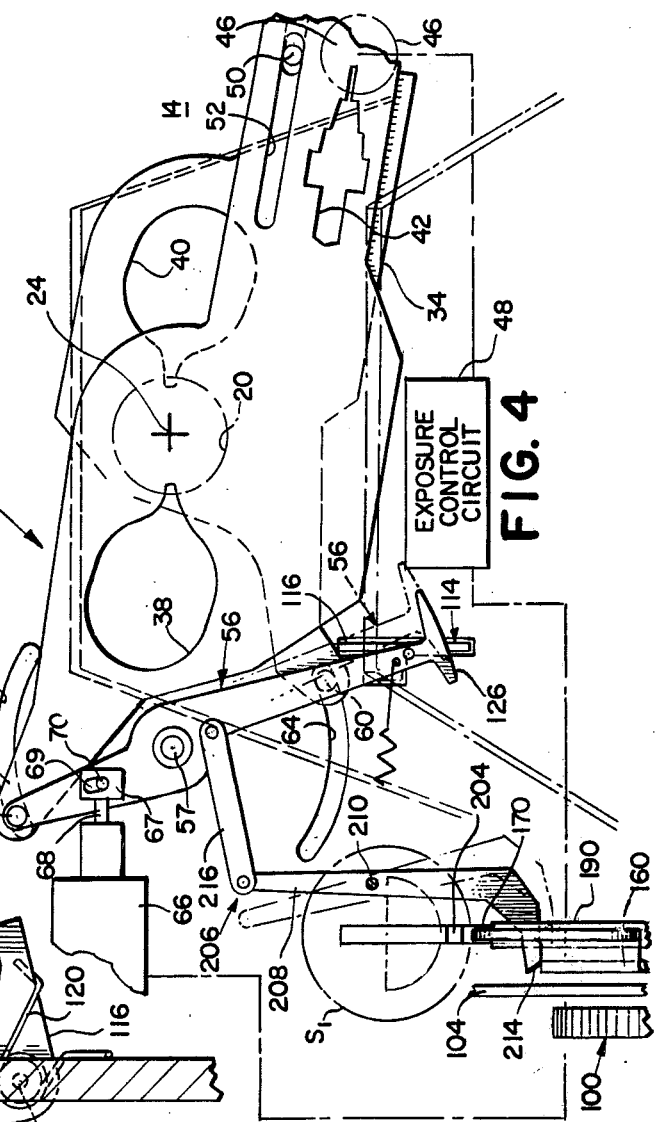

COMBINED SOLENOID AND TIMING SYSTEM FOR SLR CAMERA APPARATUS

BACKGROUND OF THE INVENTION

This invention relates to an automatic camera apparatus of the single lens type for use with self-developing type film, and in particular, to a camera apparatus of the single lens reflex type for use with self-developing type film wherein the automatic camera operations are mechanically controlled in a comparatively simple manner.

Photographic cameras of the single lens reflex type for use with self-developing film such as Polaroid Corporation's SX-70 Model Cameras are now well known in the art. These cameras require only that the photographer frame and focus the scene to be photographed after which a start button is depressed to cause the control system of the camera to commence a fully automated photographic cyclce which terminates upon the delivery of a fully-processed print. Such a camera is fully described in U.S. Pat. No. 3,714,879 entitled "Reflex Camera," by E. H. Land, et al, issued Feb. 6, 1973.

The photographic system embodied within such automatic cameras requires the use of a multi-event control process in which a film unit positioned at an exposure plane is secured from light both during procedures of viewing or framing and focusing as seen as well as during the performance of control operations converting the camera from one operational mode to another. For instance, the reflex component is retained against the exposure plane of the camera, thereby blocking light from reaching a film unit when viewing and focusing procedures are carried out through an open shutter or exposure mechanism. In the course of a photographic cycle, this protective positioning of the reflex component is terminated as the component is moved into an exposure position altering the path of the camera. During this conversion, the exposure chamber is maintained light tight to protect the film unit contained therein by an automated procedure wherein the shutter or exposure mechanism is retained in a closed status to block the optical path of the camera. When the reflex component is properly seated, the camera assumes an exposure mode configuration permitting an automatically controlled exposure interval to ensue. Following the automatically regulated interval during which a film unit is exposed, the exposure chamber of the camera is again made light tight by retaining the exposure mechanism in its light blocking position. Automatic processing of the exposed film unit may than take place after which the reflex component is returned to a position securing the exposure plane. Once the exposure plane is secured by the reflex component, the shutter is returned to a fully opened condition in readiness for the next succeeding photographic cycle.

The aforementioned functions are all automatically controlled through a complex electronic control circuit which is selectively actuated by way of a plurality of control switches. It is therefore a primary object of this invention to provide a simplified fully automatic reflex camera for use with self-developing type film units wherein the automatic functions are mechanically controlled without the use of such complex electronic control circuitry.

It is another object of this invention to provide a simple and economical reflex camera for use with self-developing type film wherein a plurality of photographic related operations are mechanically controlled to occur automatically in a select sequence.

Other objects of this invention will be in part obvious and will in part appear hereinafter. The invention accordingly comprises the mechanism and system possessing the construction, combination of elements and arrangement of parts which are exemplified in the following detailed disclosure.

SUMMARY OF THE INVENTION

A photographic camera of the type having means for mounting photographic film material at a given focal plane includes a shutter blade mechanism together with means for mounting the shutter blade mechanism for the displacement between an initial scene light unblocking arrangement and a scene light blocking arrangement. Selectively actuable first drive means are provided for displacing the shutter blade mechanism between its scene light blocking and unblocking arrangements. The first drive means preferably includes a selectively energizable component for displacing the shutter blade mechanism towards its scene light blocking arrangement and a resilient biasing element for yieldably urging the shutter blade mechanism towards its initial scene light unblocking arrangement.

The camera further includes a mirror assembly together with means for mounting the mirror assembly for displacement between an initial position wherein it precludes scene light passing through the shutter blade mechanism from impinging upon the focal plane and another position wherein it redirects scene light passing through the shutter blade mechanism towards the focal plane. Selectively actuable second drive means are provided for displacing the mirror assembly between its initial and other positions wherein the second drive means includes means for yieldably urging the mirror assembly towards its other position.

A first latch mechanism is mounted for displacement between an initial position wherein it engages the mirror assembly to preclude its displacement from its initial position into its other position under the influence of the mirror assembly urging means, and another position wherein it does not preclude movement of the mirror assembly between its initial and other positions. The shutter blade mechanism includes means for facilitating the movement of the latch mechanism into its other position in response to the shutter blade mechanism reaching its scene light blocking arrangement and for permitting the displacement of the latch mechanism back into its mirror assembly engaging position responsive to the shutter blade mechanism being returned to its scene light unblocking arrangement.

A second latch mechanism is mounted for displacement between an initial position wherein it does not preclude movement of the shutter blade mechanism from its scene light blocking arrangement towards its scene light unblocking arrangement under the influence of the resilient urging element and a second arrangement wherein it is adapted to preclude movement of the shutter blade mechanism from its scene light blocking arrangement towards its scene light unblocking arrangement. The mirror assembly facilitates the displacement of this second latch mechanism from its initial position into its second position as the mirror assembly is displaced from its initial position into its other position and mechanically effects the displacement of the latch mechanism back into its initial position as the mirror assembly is returned to its initial position.

Manually actuable means are provided for coupling the camera to a source of electrical energy and for actuating the first drive means to effect the displacement of the shutter blade mechanism into its light blocking arrangement under the influence of the energizable component, whereby the mirror assembly is displaced into its scene light redirecting position under the influence of the mirror assembly urging means. The displacement of the mirror assembly into its scene light redirecting position operates to displace the second latch mechanism into its second arrangement. The manually actuable means then operates to actuate the first drive means to effect the displacement of the shutter blade mechanism to its scene light unblocking arrangement under the influence of its resilient urging element and then back to its scene light blocking arrangement under the influence of its energizable component to define an exposure interval. The manually actuable means then operates to de-energize the energizable component with the second latch mechanism operating to retain the shutter blade mechanism in its scene light blocking arrangement at such time. The manually actuable means then actuates the second drive means to effect the displacement of the mirror assembly back to its initial scene light precluding position wherein the second latch is returned to its initial position allowing the resilient biasing element of the first drive means to effect the displacement of the shutter blade mechanism block to its scene light unblocking position. Displacement of the shutter blade mechanism back to its initial scene light unblocking position operates to reset the first latch mechanism into engagement with the mirror assembly.

DESCRIPTION OF THE DRAWINGS

The novel features that are considered characteristic of the invention are set forth with particularity in the accompanying claims. The invention itself, however, both as to its organization and method of operation together with other objects and advantages thereof will be best understood from the following description of the illustrated embodiment when read in connection with the accompanying drawings wherein like numbers have been employed in the different figures to denote the same parts, and wherein:

FIG. 1A is a cross-sectional side view of a portion of the camera of FIG. 1 showing another arrangement for the camera components as occurs during the operation of the camera of this invention;

FIG. 4 is a cross-sectional front view of the camera of FIG. 1 showing still another arrangement for the camera components as occurs during the operation of the camera of this invention;

FIG. 5 is a cross-sectional view taken along the lines 5-5 of FIG. 2 showing a different arrangement for the camera components as occurs during the operation of the camera of this invention;

FIG. 6 is still another cross-sectional view taken along the lines 5—5 of FIG. 2 showing a different arrangement for the camera components;

FIG. 7 is a cross-sectional view taken along the lines 7—7 of FIG. 4 showing a different arrangement for the camera components as occurs during the operation of the camera of this invention; and FIG. 8 is a cross-sectional view taken along the lines 7—7 of FIG. 4 showing a different arrangement for the camera components as occurs during the operation of the camera of this invention.

DESCRIPTION OF THE PREFERRED EMBODIMENT

Figure 1:
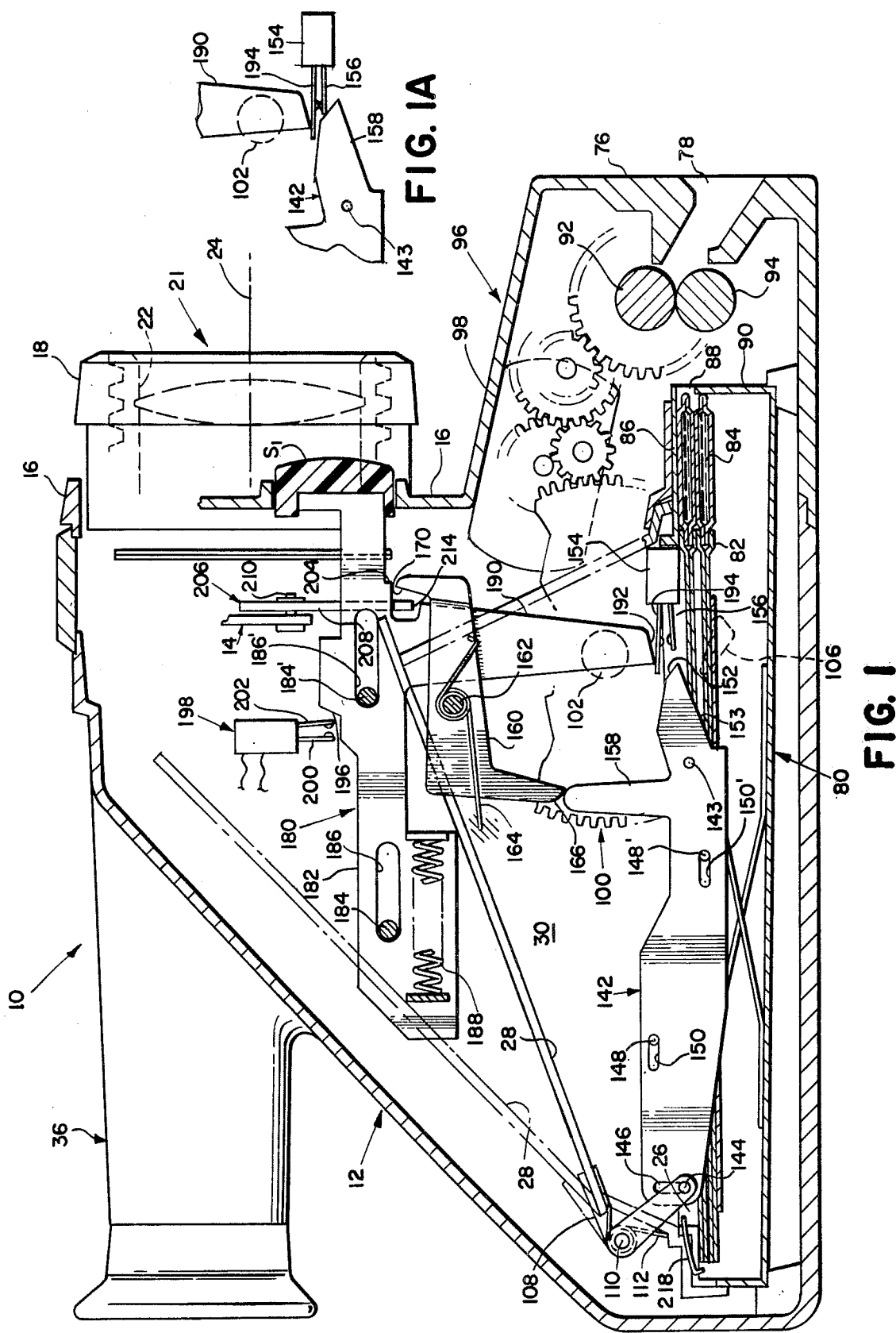
FIG. 1 is a cross-sectional side view of the reflex camera of this invention.
Figure 2:
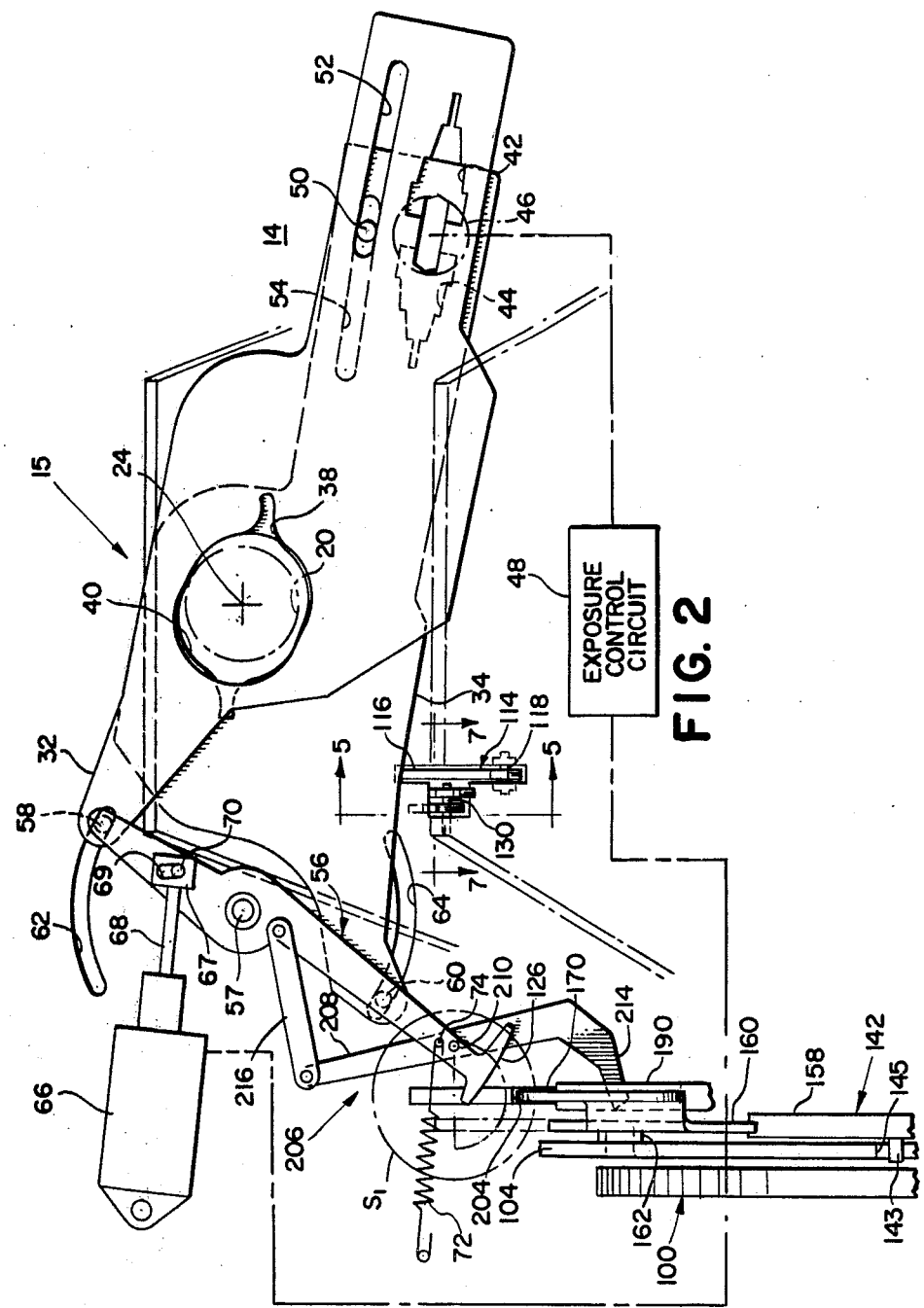
FIG. 2 is a cross-sectional front view of the camera of FIG. 1.

Referring to FIGS. 1 and 2, there is shown the photographic camera apparatus 10 of this invention contained within a housing shown generally at 12. A baseblock casting 14 is fixedly stationed within the housing 12 and selectively machined to support the various components of an exposure control mechanism as shown generally at 15. Surrounding the front and top of the baseblock casting 14, there is provided a cover section 16 which includes at least one opening through which extends a manually adjustable focus bezel 18. Centrally disposed within the baseblock casting 14, there is provided a light entering exposure opening 20 which defines the maximum available exposure aperture for the photographic system.

An objective or taking lens 21 is provided in overlying relation to the light entering exposure opening 20 and comprises a plurality of lens elements retained in predetermined spaced relationship by a cylinderical lens mount 22 which is externally threaded for toothed engagement within the internally threaded focus bezel 18. As is readily apparent, focus bezel 18 is made rotatable with respect to the front cover section 16 to provide translational movement of the elements of lens 21 along a central optical axis 24 of the optical path of the housing 12. As is readily apparent, the central optical axis 24 is illustrated in FIG. 2 as being normal to the plane of the drawing. Thus, rotation of focus bezel 18 may be carried out by manual rotation to provide displacement of the elements of objective lens 21 for focusing of image carrying rays through the light entering exposure opening 20 to a rearwardly positioned film or focal plane 26 by way of a reflex mirror assembly 28 all of which are stationed within a suitable light tight chamber 30 within the housing 12.

Intermediate the objective lens 21 and the light entering exposure opening 20, there is provided a blade mechanism including two over-lapping shutter blade elements 32 and 34 of the so-called "scanning type" which will be subsequently described in greater detail herein. Extending from the front cover section 16, there is provided a photographic cycle initiating button $S_1$, the depression of which commences a photographic exposure cycle by ultimately effecting the release of the shutter blade elements 32 and 34 in a manner to be subsequently described herein.

The housing section 12 may include an integrally molded viewfinder housing 36 extending rearwardly from the front cover section 16. The viewfinder housing 36 affords protection to internal components positioned therein and enables the user to compose and frame a desired subject of a scene to be photographed through the objective lens 21 included within the front cover section 16.

A pair of scene light admitting primary apertures 38 and 40 are provided respectively in the blade elements 32 and 34 to collectively define a progressive variation of effective aperture openings in accordance with simultaneous longitudinal and lateral displacement of one blade element with respect to the other blade element in a manner as is fully described in a U.S. Pat. No. 3,942,183 entitled "Camera With Pivoting Blade" by G. Whiteside, issued Mar. 2, 1976, in common assignment herewith. The apertures 38 and 40 are selectively shaped so as to overlap the light entering exposure opening 20, thereby defining a gradually varying effective aperture size as a function of the blade elements 32 and 34.

Each of the blades 32 and 34 may additionally be configured to have corresponding photocell sweep secondary apertures shown respectively at 42 and 44. Secondary apertures 42 and 44 may be configured in correspondence with the shapes of scene light admitting primary apertures 38 and 40. As is readily apparent, the secondary apertures 42 and 44 also move in correspondence with the primary apertures 38 and 40 to define a small secondary effective aperture for admitting scene light transmitted through a photocell aperture (not shown) in the front cover section 16 of housing 12, from the scene being photographed.

Scene light admitted by the effective secondary aperture defined by the photocell apertures 42 and 44 is thereafter directed to a light detecting station shown generally at 46. The same light detecting station 46 includes a photoresponsive element which cooperates with a light integrating capacitor together with light integrating and control circuitry as shown generally at 48 and as is more fully described in U.S. Pat. No. 4,008,481 entitled "Exposure Control System with Separate Flash and Ambient Trigger Levels," by G. Whiteside, issued Feb. 15, 1977, in common assignment herewith. In this manner, the exposure interval can be terminated as a function of the amount of light received through the secondary effective aperture defined by the overlapping photocell sweep apertures 42 and 44.

Projecting from the baseblock casting 14 at a location spaced laterally apart from the light entering exposure opening 20, there is provided a pivot pin or stud 50 which pivotally and translatably engages respective ones of a pair of elongated slots 52 and 54 formed in respective shutter blade elements 32 and 34. Pin 50 may be integrally formed with the baseblock casting 14 and blade elements 32 and 34 may be retained in engaging relation with respect to the pin 50 by any suitable means such as peening over the outside end of pin 50.

The opposite ends of the blade elements 32 and 34 respectively include extended portions which pivotally connect to a walking beam 56. Walking beam 56, in turn, is disposed for rotation relative to the baseblock casting 14 by pivotal connection to a projecting pivot pin or stud 57 which may be integrally formed with the baseblock casting 14 at a location spaced laterally apart from the light entering exposure opening 20. The walking beam 56 may be pivotally retained with respect to the pin 57 by conventional means such as an E ring (not shown). In the preferred mode, the walking beam 56 is pivotally connected at its distal ends to the shutter blade elements 32 and 34 by respective pin members 58 and 60 which extend laterally outward from the walking beam 56. Pin members 58 and 60 are preferably circular in cross section and extend through respective circular openings in respective blade elements 32 and 34 so as to slidably engage respective arcuate slots or tracks 62 and 64 which may be integrally formed within the baseblock casting 14. The arcuate tracks 62 and 64 operate to inhibit disengagement of the blade elements 32 and 34 from their respective pin members 58 and 60 during operation of the exposure control system. Thus, the walking beam 56 and the pivot pin 50 collectively define a means for mounting the blade mechanism for displacment between an initial scene light unblocking arrangement as shown in Figure 2 wherein the blade mechanism defines at least one aperture value structured for transmission of scene light to the viewfinder 36 and one scene light blocking arrangement 25 shown in FIG. 4 operating to preclude the transmission of scene light through the exposure opening 20.

Drive means are provided for driving the blade mechanism between its two arrangements. The drive means comprises a tractive electromagnetic device in the form of a solenoid 66 employed to displace the shutter blade elements 32 and 34 with respect to each other and the baseblock casting 14. The solenoid 66 includes an internally disposed cylindrical plunger 68 which retracts inwardly into the body of the solenoid upon energization of the solenoid winding. The solenoid plunger 68 includes an end cap 67 at the outside end thereof together with a vertical slot or groove 69 within the end cap 67 for loosely engaging a pin 70 extending outwardly from the walking beam 56. In this manner, the solenoid plunger 68 is affixed to the walking beam 56 so that longitudinal displacement of the plunger 68 will operate to rotate the walking beam 56 around its pivot pin 57 so as to appropriately displace the shutter blade elements 32 and 34. The drive means may additionally include a biasing tension spring 72, one end of which connects to the walking beam 56 at pin 74 and the other end of which is grounded with respect to the baseblock casting 14 for continuously urging the walking beam 56 and its associated blade elements 32 and 34 into positions defining their largest effective aperture over the light entry exposure opening 20 as shown in FIG. 2. Thus, with the spring connection herein described, the exposure control system is biased to continuously urge the shutter blade elements 32 and 34 into an open orientation in order to facilitate through the lens viewing as is well known for cameras of the single lens type herein described.

Figure 3:
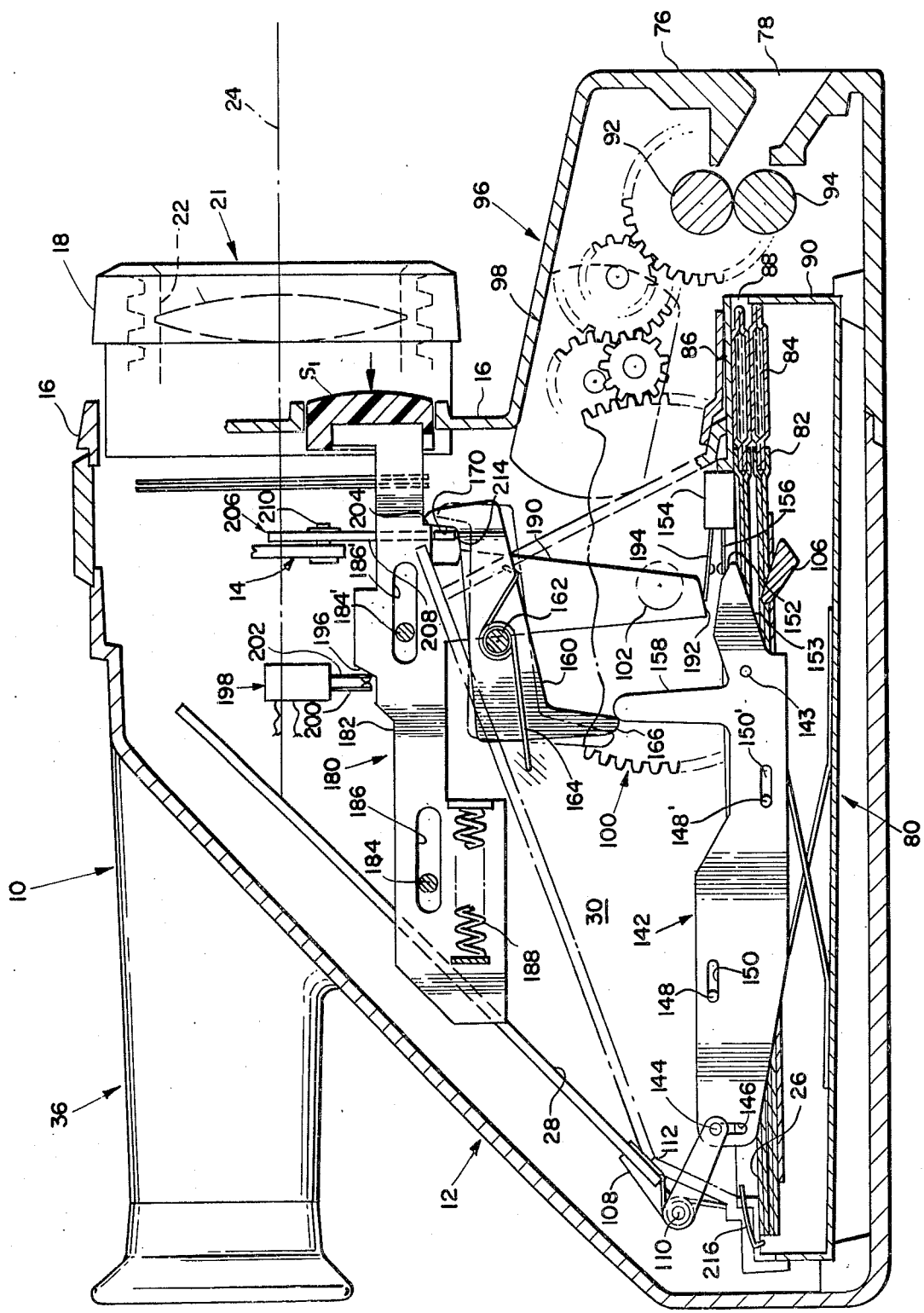
FIG. 3 is a cross-sectional side view of the camera of FIG. 1 showing another arrangement for the camera components as occurs during the operation of the camera of this invention.

Referring now to FIG. 3, there can be seen to be provided a film loading access door 76 including a film withdrawal slot 78 transversely disposed therein. Film loading access door 76 is pivotally mounted for movement between positions blocking and unblocking an open end off the lower portion of the chamber 30 which is adapted to receive and support a film cassette or container 80 therein. The cassette 80 encloses an assemblage including a plurality of film units 82 and a dark slide (not shown) superpositioned thereto for preventing exposure of a forwardmost film unit prior to insertion of the film cassette 80 into the chamber 30 in a manner which is well known in the art. The film units 82 are multilayered structures including one or more image receiving layers arranged in superposed relation and a rupturable pod 84 containing a supply of fluid processing composition attached to a leading end of the film unit 82. The film cassette 80 including the assemblage is similar to that disclosed and defined in U.S. Pat. No. 3,874,875 issued to E. H. Land on Apr. 1, 1975. The film units 82 included in the assemblage represent a general class of "integral type" self-developing type film units similar to that described in U.S. Pat. No. 3,415,644 issued to E. H. Land on Dec. 10, 1968.

The film cassette 80 is shown in position within the lower portion of the light tight chamber 30 of the camera in FIGS. 1 and 3. The cassette 80 has a general tapered rectangular shape having a forward wall 86 including an exposure aperture therein which is generally coextensive with the photosensitive area of the underlying film unit 82 contained with the cassette 80. Once the cassette 80 has been properly positioned within the chamber 30, the darkslide cover must be removed prior to commencing a first photographic cycle whereupon the forwardmost film unit 82, subsequent to exposure, is advanced through an elongated film exit slot 88 disposed transversely within a leading end wall 90 of the film cassette 80. As the forwardmost member advances through the exit slot 88, it enters into the bite of a pair of juxtaposed pressure applying members or rollers 92 and 94 mounted adjacent the withdrawal slot 78.

The film loading access door 76 is pivotally connected to the housing 12 in such a manner so as to allow the access door 76 and the rollers 92 and 94 to be pivoted downwardly to provide access to the chamber 30 for loading and unloading the film cassette 80. A detailed description of the manner in which the film loading access door and rollers 92 and 94 are coupled to the remainder of the camera 10 may be found in a copending application Ser. No. 582,720 filed on June 2, 1975 in the name of Andrew S. Ivester entitled "A Mounting Apparatus For a Spreader Roller Assembly." The rollers 92 and 94 are suitably mounted within the access door 76 by a mounting bracket (not shown).

The camera 10 is further provided with additional drive means comprising a gear train shown generally at 96 in FIGS. 1 and 3 together with an electrically energized motor 98 for driving the gear train 96 in a well known manner. The motor 98 is preferably energized by a battery which is included in the film cassette 80 in a manner which is more fully disclosed in U.S. Pat. No. 3,543,662 issued to Irving Erlichman on Dec. 1, 1970.

A sequencing gear or wheel 100 is rotatably driven by the motor gear train 96. The sequencing gear 100 includes a center bore therethrough disposed for rotation about a shaft 102 extending laterally outward from a side mounting member 104. The sequencing wheel 100 further includes a profile cam 106 extending laterally outward from a side thereof for reasons which should become apparent from the following discussion.

The reflecting mirror 28 is connected to the upper arm portions of a pair of spaced apart bell cranks, one of which is shown at 108 in FIGS. 1 and 3. Each bell crank 108 is rotatively mounted with respect to the camera housing 10 by way of a respective pivot pin 110. In this manner, means are provided for mounting the reflex mirror for displacement between an initial scene light blocking position precluding transmission of scene light from the blade mechanism to the film plane 26 as shown in FIG. 1 and a scene light unblocking position for redirecting scene light received from at least one effective aperture value defined by the blade mechanism to the film plane 26 as shown in FIG. 3. A portion of the means for driving the reflex mirror 28 between its aforementioned two positions is provided by a yieldable biasing element in the form of a torsion spring 112 which operates to continuously urge the reflex mirror 28 to rotate in a counterclockwise direction as viewed in FIGS. 1 and 3 from its scene light blocking position to its scene light unblocking position.

A latch mechanism or assembly as shown generally at 114 is provided for holding the reflex mirror 28 in its initial scene light blocking position against the urging of the biasing element 112. The mirror latch assembly 114 comprises a bell crank 116 disposed for rotation with respect to the base block casting 14 by means of a pivot pin 118. One depending arm portion of the bell crank 116 includes an integral tang 122 at the outward end thereof which may be latched with the outward edge of the reflex mirror 28 as best shown in FIG. 6. The other arm portion of the bell crank 116 includes a cam follower surface 124 which follows the movement of a cam surface 126 integrally molded to the lower distal end of the walking beam 56. As is now readily apparent, the torsion spring 120 operates to bias the latch assembly 114 into its latched position against the reflex mirror 28 while simultaneously maintaining the cam follower surface 124 in the locus of travel of the cam surface 126 of the walking beam 56. Thus, when the blade mechanism is displaced into its scene light blocking position shown at FIG. 4, the cam surface 126 of the walking beam 56 operates to engage the cam follower surface 124 of the latch assembly 114 so as to rotate the bell crank 116 in a clockwise direction as viewed in FIG. 5 against the resilient bias of the torsion spring 120 so as to unlatch the reflex mirror 28.

A bell crank stop member 128 is disposed in closely spaced apart relation to the mirror latch assembly 114 for rotation with respect to the base block casting 14 about a pivot pin 130. The stop member 132 is biased by a tension spring 134 for rotation in a clockwise direction out of interfering relation with the locus of travel of the walking beam 56. The stop member 128 includes one dpending arm portion 128A which extends into the locus of travel of the mirror 28 together with another depending arm portion 128B which may be rotated into the locus of travel of the walking beam 56 in a manner to be subsequently described.

There is also provided a walking beam latch mechanism including a latch member 136 disposed in closely spaced apart relation with respect to the stop member 128. The walking beam latch member 136 also closely resembles a bell crank and is mounted for pivotal movement with respect to the base block casting 14 by the pivot pin 130. A tension spring 138 is provided to yieldably bias the latch member 136 for rotation in a clockwise direction as shown in FIGS. 5 and 6. The walking beam latch member 136 further includes a depending arm portion 136A which also extends into the locus of travel of the reflex mirror 28 together with another depending arm portion 136B which may be rotated into the locus of travel of an integrally molded detent 140, on the walking beam 56 in a manner to become readily apparent from the following discussion.

Referring now to FIGS. 1 and 3, there is shown a drive link or ram member 142 disposed for reciprocal translation with respect to a side mounting member 104 by elongated slots 150, 150' which respectively engage pin members 148, 148' extending laterally outward from the side mounting member 104. The ram member 142 includes an elongated slot 146 which is slidably engaged by a pin member 144 extending laterally outward from the bell crank 108. The forward end of the ram member 142 defines a cam surface 152 which slidably engages a lower resilient switch leaf 156 from an on-off motor switch 154 which operates to power the electric motor 98 as will be subsequently described. Spaced closely apart from the cam surface 152, there is provided an integral follower pin 143 extending laterally outward from the ram member 142 and through an elongated opening 145 in the side mounting member 104 as best seen in FIG. 2. The ram member 142 is further provided with an integral extended arm portion 158 depending therefrom for cooperative engagement with a button latch member 160 in a manner also to be subsequently described.

The button latch member 160 is rotatably connected with respect to the side mounting member 104 by a pivot pin 162, and is also yieldably biased for rotation in a counterclockwise direction as viewed in FIGS. 1 and 3 by means of a torsion spring 164. The latch member 160 includes an integral follower arm portion 166 depending downwardly therefrom for cooperative engagement with the integral arm portion 158 from the ram member 142 as will be subsequently described. The other depending arm portion of the button latch member 160 terminates in a bent over tang 170 which operates to latch a button sliding assembly as shown generally at 180 in a manner to be subsequently described.

The button slider assembly 180 comprises a slider member 182 disposed for reciprocal sliding movement with respect to the side mounting member 104 by a pair of spaced apart elongated slots 186,186' which respectively slidingly engage a pair of spaced apart pins 184, 184' extending laterally outward from the side mounting member 104. The slider member 182 connects at its forward end to the photographic cycle initiating button $S_1$ and is yieldably biased by a compression spring 188 to move in a forward direction against any actuating force which may be applied to the button $S_1$. The slider member 182 further includes an integral arm portion 190 depending downwardly therefrom and defining a cam surface 192 at the lower end thereof for cooperative engagement with a resilient upper switch leaf 194 from the motor switch 154 in a manner as will become apparent from the following discussion. The slider member 182 further includes a cam surface 196 on the top surface thereof for cooperative sliding engagement with a resilient switch leaf 202 which extends downwardly from a control circuit switch 198. The control circuit switch 198 controls the application of power to the exposure control circuit 48 in a manner as will become apparent from the following discussion. The control circuit switch 198 includes another resilient switch leaf 200 disposed in a closely spaced apart adjacent relation to the switch leaf 202. The slider member 182 further includes a stop surface 204 which may be selectively engaged by the tang 170 from the button latch member 160.

Referring now to FIGS. 2 and 4 in conjunction with FIGS. 1 and 3, there is shown an unlatch assembly 206 which comprises an elongated lever arm 208 disposed for pivotal movement with respect to the base block casting 14 by a pivot pin 210. The lower edge of the lever arm 208 defines an integral ramped stop surface 214 which may be selectively moved into engagement with the top edge of the latch member 160 as best shown in FIG. 4. Toward this end there is provided a drive link 216 pivotally connected at one end to the upper distal end of the elongated lever arm 208 and pivotally connected at its other end to the walking beam 56.

Camera operation may proceed as follows. As is readily apparent, the shutter blade elements 32 and 34 of the blade mechanism are normally biased toward their scene light unblocking arrangement as shown in FIG. 2 so as to allow the photographer to view and compose the scene to be photographed directly through the objective lens 21. Scene light admitted through the blade mechanism to the view finder 36 is prohibited from reaching the film plane 26 by the reflecting mirror 28 which is initially in its scene light blocking position as shown in FIG. 1. In order to initiate exposure of the forwardmost film unit 26, the user must depress the photographic cycle initiating button $S_1$ which in turn operates to move the slider assembly 180 rearwardly from its position as shown in FIG. 1 to its position as shown in FIG. 3. Such rearward movement of the slider assembly 180 causes the cam surface 196 to move the switch leaf 202 into contact with switch leaf 200 thereby closing the control circuit switch 198. Closure of the control switch 198, in turn, operates to energize the exposure control circuit 48 in turn energizing the solenoid 66 so as to effect an inward displacement of the plunger 68, thereby rotating the walking beam 56 in a counterclockwise direction so as to move the shutter blade elements 32 and 34 from their initial scene light unblocking arrangement as shown in FIG. 2 toward their scene light blocking arrangement as shown in FIG. 4. Counterclockwise rotation of the walking beam 56 is ultimately stopped by the stop surface 132 of the stop member 128 which engages the leading edge of the walking beam as best shown in FIG. 7.

Such counterclockwise rotation of the walking beam 56 simultaneously operates to move the cam surface 126 into engagement with the cam follower surface 124 of the mirror latch assembly 114. The mirror latch assembly 114 is thereby rotated in a clockwise direction from its position as shown in FIG. 6 to its position as shown in FIG. 5 against the resilient bias of torsion spring 120.

The reflex mirror 28 is thereafter rotated from its initial scene light blocking position as shown in FIG. 1 to its scene light unblocking position as shown in FIG. 3 for directing scene light received from the blade mechanism to the film plane 26. Rotation of the mirror 28 in this manner operates to release both the stop member 128 and the latch member 136 for clockwise rotation, under the biasing influence of their respective springs 134, 138, from their positions as shown in FIG. 6 to their positions as shown in FIG. 5. The stop member 128 is thus rotated out of potential interferring relation with the locus of travel of the walking beam while the latch member 136 is moved into potential latching position with respect to the walking beam detent 140.

As is readily apparent, such rotational movement is imparted to the reflex mirror 28 by way of the bell cranks 108 under the urging influence of torsion spring 112. Rotation of the bell cranks 108 additionally operate to slide the ram member 142 forwardly from its position as shown in FIG. 1 to its position as shown in FIG. 3 so as to cause the cam surface 152 to move the switch leaf 156 upwardly by a determinate amount which is not sufficient to bring it into contact with the opposing switch leaf 194 thereby not closing the motor switch 154 at this instant. In addition, forward movement of the ram member 142 also operates to move its extended arm portion 158 forwardly out of engagement with the follower arm 166 thereby enabling the bell crank latch member 160 to be rotated in a counterclockwise direction by its biasing torsion 164. The latch member 160 does not initially move at this instant, however, as a result of the unlatch assembly 206 being moved into its position as shown in FIG. 4, by the closure of the shutter blade mechanism. Thus, the ramped stop surface 214 is moved into engagement with the upper edge of the button latch member 160 so to prohibit its counterclockwise rotation into latching engagement with the slider assembly 180.

The exposure control system 48 may include an appropriate timing circuit to insure that the solenoid 66 remains energized for the minimum time sufficient to insure that the aforementioned mechanical operations occur, after which, the solenoid 66 is de-energized in order to commence an exposure interval. The de-energization of the solenoid 66 allows the walking beam 56 to be rotated in a clockwise direction under the influence of its biasing spring 72 so as to effect a progressive enlargement of the effective aperture as defined by the primary apertures 38 and 40 over the light entering exposure opening 20. Initial rotation of the walking beam 56 operates immediately by way of the drive link 216 to rotate the unlatch assembly 206 and its associated ramped stop surface 214 out of engagement with the overlying edge of the button latch member 160 thereby permitting it to be rotated by its torsion spring 164 into latching engagement with the stop surface 204 as shown in solid lines in FIG. 3. The slider assembly 180 now becomes latched in its rearwardmost position as shown in FIG. 3 where it will remain regardless of the release of the photographic cycle initiating button $S_1$ by the operator. As is readily apparent, up to this instant release of the button $S_1$ by the operator could result in an aborted photographic cycle, however, such a release prior to this instant would not ordinarily be expected considering the normal human reaction time.

Rotation of the walking beam 56 as previously discussed affects a simultaneous linear and angular movement of the shutter blade elements 32 and 34 about the pivot pin 50 so that the photocell sweep secondary appertures 42 and 44 define a corresponding progressively enlarging aperture over the scene light detecting station 46. Thus, from the instant the photographic cycle is initiated upon the de-energization of the solenoid 66, a photoresponsive element (not shown) in scene light detecting station 46 provides a time varying response corresponding to the intensity of scene light incident thereon. As integrating circuit operates in conjunction with the photoresponsive element to provide a signal which is representative of the time integration of the scene light intensity incident to the photoresponsive element. Upon reaching a pre-determined exposure of the forwardmost film unit 82, exposure control circuit 48 again energizes the solenoid 66 to retract the plunger 68 therein and rotate the walking beam 56 in a counterclockwise direction back to the scene light blocking arrangement as shown in phantom lines in FIG. 4 to terminate the exposure interval period. The walking beam 56 rotates past the stop member 128 and is subsequently latched in its scene light blocking position by the latch member 136 engaging the walking beam detent 140 as best shown in FIG. 8.

Rotation of the walking beam 56 back to its scene light blocking position as shown in FIGS. 4 and 8 operates by way of the drive link 216 to rotate the lever arm 208 of the unlatch assembly 206 back into its position as shown in FIG. 4. The ramped stop surface 214 thus moves against the overlying edge surface of the latch member 160 so as to rotate it in a clockwise direction against the yieldable bias of its torsion spring 164. In this manner, the latch member 160 is moved out of latching engagement with the slider assembly 180 thereby allowing the slider assembly 180 to be moved forward under the urging influence of its biasing compression spring 188 upon the release of photographic cycle initiating button $S_1$.

Forward translation of the slider assembly 180 from its position as shown in FIG. 3 back to its initial position as shown in FIG. 1 operates to move the cam surface 196 out of engagement with the switch leaf 202 thereby opening the control circuit switch 198 so as to remove the battery voltage from the exposure control circuit 48. The solenoid is thus de-energized, but the blade mechanism remains in its scene light blocking arrangement as a result of the walking beam detent 140 being engaged by the latch member 136 in the aforementioned manner. In addition, the aforementioned movement of the slider assembly 180 also operates to move the cam surface 192 into engagement with the upper switch leaf 194 so as to move it into contact with the lower switch leaf 156 thereby closing the motor switch 154 as best shown in FIG. 1A. Closure of the motor switch 154, in turn, powers the electric motor 98 so as to drive the gear train 96 and the processing rollers 92 and 94 in concert with the sequencing gear 100.

The forwardmost film unit 82 adjacent the focal plane 26 is advanced forwardly through the withdrawal slot 88 and into the bite of the rollers 92 and 94 by a pick mechanism partially shown at 216 and operated in a manner as is more fully disclosed in U.S. Pat. No. 4,017,876 entitled "Shutter Latch System with Automatic Release For Shock Damping Member" by E. Coughlan, et al., issued Apr. 12, 1977. The film unit 82 is thereafter processed by the pressure applying rollers 92 and 94 and ejected from the camera apparatus by way of the film withdrawal slot 78 in the film loading access door 76.

Continued rotation of the sequencing gear 100 operates to rotate the profile cam 106 against the follower pin 143 so as to slide the ram member 142 rearwardly back to its initial position as show in FIG. 1. Such rearward movement of the ram member 142 operates to move cam surface 152 out of engagement with the switch leaf 156 thereby opening the motor switch 154 so as to de-energize the motor 98. The motor 98 has sufficient momentum to continue to drive the profile cam 106 entirely past the follower pin 143 in readiness for a subsequent photographic cycle.

As is readily apparent rearward movement of the ram member 142 also operates to rotate the bell cranks 108 in a clockwise direction as viewed in FIGS. 1 and 3 against the yieldable bias of torsion spring 112 so as to drive the reflex mirror 28 from its scene light unblocking position as shown in FIG. 3 back to its initial scene light blocking position as shown in FIG. 1.

The forward edge of the returning mirror 28 first engages the arm 136A so as to rotate the latch member 136 in a counterclockwise direction against the yieldable bias of its tension spring 138 thereby releasing the walking beam 56 for rotation in a counterclockwise direction under the biasing influence of its tension spring 72. The forward edge of the reflex mirror 28 next engages the arm 128A so as to rotate the stop member 128 in a counterclockwise direction against the yieldable bias of its tension spring 134 so as to move the stop surface 132 back into its initial position in interferring relation with respect to the locus of travel of the walking beam 56. As should be readily apparent, release of the walking beam by the latch 136 is selected to allow sufficient time for the walking beam 56 to be rotated past the stop member 128 before the stop member 128 is released. In this manner, the stop surface 132 is returned to its initial position without scratching the side of the walking beam 56.

Release of the walking beam 56, in turn, moves the cam surface 126 out of engagement with the cam follower surface 124 thereby permitting the mirror latch assembly 114 to be rotated in a counterclockwise direction by its biasing torsion spring 120 so as to relatch the mirror 28 in its initial scene light blocking position. The aforementioned mechanical operations are timed so that the reflex mirror 28 is relatched by the mirror latch assembly 114 prior to the profile cam 106 being driven past the cam follower surface 153. In this manner, the latch member 136 provides a means for actuating the shutter blade drive spring 72 to drive the blade mechanism from its scene light blocking arrangement back to its initial scene light unblocking arrangement in readiness for viewing and composing a subsequent scene to be photographed.

Thus, there is provided an exposure control system having a simplified exposure control circuit controlled by a single switch element which is closed upon a manual actuation of the photographic cycle initiating button and which is thereafter opened in response to the manual de-actuation of the photographic cycle initiating button. The control means further comprises the button latch member 160 which operates in conjunction with the unlatch assembly 206 to inhibit the premature release of the photographic cycle initiating button $S_1$, at least prior to the film exposure portion of the photographic cycle. Drive motor 98 in conjunction with the gear train 96, motor switch 154, sequencing gear 100, profile cam 160, ram member 142, bell cranks 108, and torsion spring 112, collectively comprise a second drive means for driving the reflex mirror between its two arrangements as previously discussed. The second drive means is actuated in a simple mechanical fashion upon the de-actuation of the photographic cycle initiation button $S_1$ whereupon this second drive means operates automatically to disconnect power to itself upon completion of its mirror resetting operation. It will additionally be appreciated that the shutter blade mechanism is maintained in its scene light blocking arrangement during the film processing operation which occurs subsequent to exposure by a simple mechanical latch mechanism thereby permitting the de-energization of the solenoid upon release by the photographic cycle initiating button in order to conserve battery energy.

Since certain changes may be made in the above-described embodiment without departing from the scope of the invention herein involved, it is intended that all matter contained in the above description or shown in the accompanying drawings shall be interpreted as illustrative and not in a limiting sense.

What is claimed is:

1. A photographic camera having means for mounting photographic film material of the self-developing type at a given focal plane and for receiving a source of electrical energy, said camera comprising:

a manually actuable member mounted for reciprocal movement between an initial position and a second position;

a shutter blade mechanism;

means for mounting said shutter blade mechanism for displacement between an initial scene light unblocking arrangement and a scene light blocking arrangement;

selectively actuable drive means for displacing said shutter blade mechanism between its said scene light blocking and unblocking arrangements, said drive means including an electrically energizable component for displacing said shutter blade mechanism towards its said scene light blocking arrangement and a resilient biasing element for yieldably urging said shutter blade mechanism towards its said initial scene light unblocking arrangement;

a mirror assembly;

means for mounting said mirror assembly for displacement between an initial position wherein it precludes scene light passing through said shutter blade mechanism from impinging upon the focal plane and another position wherein it redirects scene light passing through said shutter blade mechanism towards the focal plane;

spring means for urging said mirror assembly from its said initial position towards it said other position;

a film processing and advancing roller;

a motor;

an energizable scene light detecting and integrating device;

a normally non-conducting first switch coupled to the source of electrical energy and arranged to be rendered conductive when said manually actuable member is displaced from its initial position to its said second position and again non-conductive when said manually actuable member is returned to its said initial position;

a normally non-conductive second switch coupled between the source of electrical energy and said motor;

means for rendering said second switch conductive and for sequentially utilizing said energized motor to drive said roller and thus effect the return of said mirror assembly to its said initial position when said manually actuable member is returned to its said initial position and said mirror assembly is in its said other position and for rendering said second switch again non-conductive when said mirror assembly is subsequently returned to its said initial position;

means responsive to rendering said first switch conductive for actuating said drive means to effect the displacement of said shutter blade mechanism into its said light blocking arrangement under the influence of said energizable component, for then effecting the displacement of said mirror assembly into its said scene light redirecting position under the influence of said spring means, for then actuating said drive means to effect the displacement of said shutter blade mechanism to its said scene light unblocking arrangement under the influence of said resilient urging element and for energizing said scene light detecting and integrating device, for then actuating said drive means to return said shutter blade mechanism back to its said scene light blocking arrangement under the influence of its said energizable component when said scene light detecting and integrating device has determined that the proper amount of scene light has impinged upon a film unit disposed at the focal plane, for then effecting the return of said manually actuable member to its said initial position whereby said first switch is rendered non-conductive and said second switch is rendered conductive to energize said motor to sequentially drive said film processing and advancing roller and effect the return of said mirror assembly to its said initial position thus rendering said second switch non-conductive and for then actuating said drive means to effect the return of said shutter blade mechanism to its said initial scene light unblocking arrangement.

2. The camera of claim 1 further including a resilient biasing element for yieldably urging said manually actuable member from its said second position back to its said initial position and wherein said means for rendering said second switch conductive includes a drive link disposed for linear translation from a first position out of interferring engagement with said second switch when said mirror assembly is in its said initial position to a second position when said mirror assembly is in its said redirecting position, said drive link when in its said second position operating to make a leaf of said second switch ready for closure to energize said motor in response to the displacement of said manually actuable member from its said second position back to its said initial position.

3. The photographic camera of claim 1 including a resilient biasing element for yieldably biasing said manually actuable member to move from its said second position to its said initial position and wherein said means for actuating said drive means includes control means cooperatively associated with said means for rendering said second switch conductive and said blade mechanism mounting means for retaining said manually actuable member in its said second position in response to said mirror assembly being displaced from its said initial scene light precluding position into its said redirecting position despite the manual deactuation of said manually actuable member and for permitting said manually actuable member to be displaced from its said second position back to its said initial position by the yieldable urging of its said resilient biasing element in response to said blade mechanism being driven from its said scene light unblocking arrangement to its said scene light blocking arrangement at the termination of an exposure interval.

4. The photographic camera of claim 3 wherein said means for rendering said second switch conductive includes a drive link disposed for linear translation from a first position when said mirror assembly is in its said initial position to a second position when said mirror assembly is in its said redirecting position, and wherein said control means includes a latch member disposed for rotation between a first position out of interferring relation with respect to said manually actuable member when said drive link is in its said first position and a second position in latching engagement with said manually actuable member so as to maintain said manually actuable member in its said second position when said drive link is in its second position, and an unlatch member disposed for rotation between a first position out of interferring relation with respect to said latch member when said blade mechanism is driven from its said scene light blocking arrangement and a second position engaged to said latch member in a manner operating to drive said latch member out of latching engagement with said manually actuable member so as to release said manually actuable member subsequent to an exposure cycle.

5. A photographic camera having means for mounting photographic film material at a given focal plane, said camera comprising:
   a shutter blade mechanism;
   means for mounting said shutter blade mechanism for displacement between an initial scene light unblocking arrangement and a scene light blocking arrangement;
   selectively actuable first drive means for displacing said shutter blade mechanism between its said scene light blocking and unblocking arrangements;
   a mirror assembly;
   means for mounting said mirror assembly for displacement between an initial position wherein it precludes a scene light passing through said shutter blade mechanism from impinging upon the focal plane and another position wherein it redirects scene light passing through said shutter blade mechanism towards the focal plane;
   selectively actuable second drive means for displacing said mirror assembly between its said initial and other positions, said second drive means including means for yieldably urging said mirror assembly towards its said other position;
   a latch mechanism mounted for displacement between an initial position, wherein it engages said mirror assembly to preclude its displacement from its said initial position into its said other position under the influence of said mirror assembly urging means, and another position wherein it does not preclude movement of said mirror assembly between its said initial and other positions, said shutter blade mechanism including means for facilitating the movement of said latch mechanism into its said other position responsive to said shutter blade mechanism reaching its said scene light blocking arrangement and for permitting displacement of said latch mechanism back into its said mirror assembly engaging position responsive to said shutter blade mechanism's being returned to its said scene light unblocking arrangement; and
   manually actuable means for coupling said camera to a source of electrical energy for actuating said first drive means to effect the displacement of said shutter blade mechanism into its said light blocking arrangement whereby said mirror assembly is displaced into its said scene light redirecting position under the influence of said mirror assembly urging means, for then actuating said first drive means to effect the displacement of said shutter blade mechanism to its said scene light unblocking arrangement and back to its said scene light blocking arrangement to define an exposure interval, for then actuating said second drive means to effect the displacement of said mirror assembly back to its said initial scene light precluding position and for then actuating said first drive means to effect the displacement of said shutter blade mechanism back to its said initial scene light unblocking position, whereby said latch mechanism again engages said mirror assembly.

6. The camera of claim 5 wherein said first drive means additionally includes an electrically energizable component for displacing said shutter blade mechanism towards its said scene light blocking arrangement and a resilient biasing element for yieldably urging said shutter blade mechanism towards its said initial scene light unblocking arrangement, and wherein said camera further includes another latch mechanism mounted for displacement between an initial position wherein it does not preclude movement of said shutter blade mechanism from its said scene light blocking arrangement towards its said scene light unblocking arrangement under the influence of said resilient urging element and a second arrangement wherein it is adapted to preclude such movement of said shutter blade mechanism from its said scene light blocking arrangement towards its said scene light unblocking arrangement, said mirror assembly facilitating the displacement of said other latch mechanism from its said initial position into its said second position as said mirror assembly is displaced from its said initial position into its said other position and for mechanically effecting the displacement of said other latch mechanism back into its said initial position as said mirror assembly is returned to its said initial position, said manually actuable means operating: to effect the displacement of said shutter blade mechanism into its said light blocking arrangement under the influence of said energizable component, to then effect the displacement of said mirror assembly into its said scene light redirecting position whereby said other latch mechanism is displaced from its said initial position into its said second arrangement, to then actuate said first drive means to effect the displacement of said shutter blade mechanism to its said scene light unblocking arrangement under the influence of said resilient element and back to its said scene light blocking arrangement under the influence of its said energizable component to define an exposure interval, to then deenergize said energizable component, said other latch mechanism serving to retain said shutter blade mechanism in its said scene light blocking arrangement at such time, to then actuate said second drive means to effect the displacement of said mirror assembly back to its said scene light precluding initial position wherein said other latch is returned to its said initial position permitting said resilient biasing element of said first drive means to effect the displacement of said shutter blade mechanism back to its said scene light unblocking position.

7. The camera of claim 5 wherein said latch mechanism includes a resilient biasing element for continuously urging displacement of said latch mechanism from its said other position wherein it does not preclude movement of said mirror assembly back into its said initial position wherein it engages said mirror assembly to preclude its displacement, said latch mechanism being displaced into its said other position against the yieldable urging of its said biasing element in response to said shutter blade mechanism reaching its said scene light blocking position and being displaced back into its said initial mirror assembly engaging position in response to said shutter blade mechanism being returned to its said scene light unblocking arrangement.

8. The camera of claim 7 wherein said latch mechanism includes a latch member disposed for pivotal movement between its said initial and other positions, said latch member having one end configured for latching engagement with said mirror assembly when in its said initial position and another end structured to define a cam follower surface, said shutter blade mounting means comprising a rotatable member having a cam surface thereon which engages said cam follower surface of said latch member in order to move said latch member from its said initial position wherein it engages said mirror assembly to its said other position wherein it does not preclude movement of said mirror assembly when said blade mechanism is moved from its said unblocking position to its said blocking position.

9. A photographic camera having means for mounting photographic film material at a given focal plane, said camera comprising:
 a shutter blade mechanism;
 means for mounting said shutter blade mechanism for displacement between an initial scene light unblocking arrangement and a scene light blocking arrangement;
 selectively actuable first drive means for displacing said shutter blade mechanism between its said scene light blocking and unblocking arrangements, said first drive means including an electrically energizable component for displacing said shutter blade mechanism towards its said scene light blocking arrangement and a resilient biasing element for yieldably urging said shutter blade mechanism towards its said initial scene light unblocking arrangement;
 a mirror assembly;
 means for mounting said mirror assembly for displacement between an initial position wherein it precludes scene light passing through said shutter blade mechanism from impinging upon the focal plane and another position wherein it redirects scene light passing through said shutter blade mechanism towards the focal plane;
 selectively actuable second drive means for displacing said mirror assembly between its said initial and other positions;
 a latch mechanism mounted for displacement between an initial position, wherein it does not preclude movement of said shutter blade mechanism from its said scene light blocking arrangement towards its said scene light unblocking arrangement under the influence of said resilient urging element and a second arrangement wherein it is adapted to preclude such movement of said shutter blade mechanism from its said scene light blocking arrangement towards its said scene light unblocking arrangement, said mirror assembly facilitating the displacement of said latch mechanism from its said initial position into its said second position as said mirror assembly is displaced from its said initial position into its said other position and for mechanically effecting the displacement of said latch mechanism back into its said initial position as said mirror assembly is returned to its said initial position;
 manually actuable means for coupling said camera to a source of electrical energy for actuating said first drive means to effect the displacement of said shutter blade mechanism into its said light blocking arrangement under the influence of said energizable component, for then effecting the displacement of said mirror assembly into its said scene light redirecting position whereby said latch mechanism is displaced into its said second arrangement, for then actuating said first drive means to effect the displacement of said shutter blade mechanism to its said scene light unblocking arrangement under the influence of said resilient urging element and back to its said scene light blocking arrangement under the influence of its said energizable component to define an exposure interval, for then deenergizing said energizable component, said latch mechanism serving to retain said shutter blade mechanism in its said scene light blocking arrangement at such time, for then actuating said second drive means to effect the displacement of said mirror assembly back to its said scene light precluding position wherein said latch is returned to its said initial position permitting said resilient biasing element of said first drive means to effect the displacement of said shutter blade mechanism back to its said scene light unblocking position.

10. The camera of claim 9 additionally including a film processing roller and wherein said second drive means includes a motor and said manually actuable means additionally includes means for utilizing said motor to drive said processing roller after said energizable component has been deenergized and while said mirror mechanism is disposed in its said other position and for thereafter effecting the displacement of said mirror assembly from its said other position back to its said initial position.

11. The photographic camera of claim 10 additionally including a movable stop member disposed for movement into a first position inhibiting said latch mechanism from precluding the movement of said shutter blade mechanism from its said scene light blocking arrangement to its said scene light unblocking arrangement in response to said mirror assembly being moved to its said initial scene light precluding position and a second position enabling said latch mechanism to preclude movement of said blade mechanism, in response to said mirror assembly being moved to its said scene light redirecting position.

12. The photographic camera of claim 11 wherein said latch mechanism includes a latch member, and a latch detent disposed for movement with said blade mounting means, said latch member being disposed for movement between its said initial position wherein it is out of interferring relation with respect to the locus of travel of said detent so as not to preclude movement of said shutter blade mechanism and its said second arrangement wherein it is in position to latchingly engage said detent to preclude movement of said shutter blade mechanism in response to said blade mechanism being driven to its said blocking arrangement when said stop member is in its said second position, said latch member further including a resilient biasing element for yieldably urging said latch member to move from its said initial position not precluding movement of said shutter blade mechanism towards its said second arrangement precluding movement of said shutter blade mechanism.

13. The photographic camera of claim 12 wherein said latch member and stop member are structured and configured with respect to each other such that said latch member is moved from its said second arrangement towards its said initial position so as to release said blade mechanism for movement towards its said unblocking arrangement prior to said stop member being moved from its said second position into its said first position in response to said mirror assembly being moved from its said scene light redirecting position back into its said initial scene light precluding position.

14. The apparatus of claim 11 wherein there is further included a resilient biasing element for yieldably urging said stop member to move from its said latch mechanism inhibiting first position to its said latch mechanism enabling second position and wherein said mirror assembly is structured and configured to engage said stop member and move said stop member from its said latch mechanism enabling second position to its said latch mechanism inhibiting first position against the yieldable urging of its said biasing element, said stop member when in its said latch mechanism inhibiting first position being further configured to engage said blade mounting means when said blade mechanism is in its said scene light blocking arrangement so as to inhibit the latching of said blade mechanism by said latch mechanism, said engagement between said stop member and said blade mounting means being maintained regardless of the yieldable urging of said biasing element when said mirror assembly is moved from its said initial scene light precluding position towards its said scene light redirecting second arrangement with the subsequent movement of said blade mechanism from its said scene light blocking arrangement towards its said scene light unblocking arrangement at the commencement of the exposure interval operating to disengage said blade mounting means from said stop member so as to allow said stop member to move from its said first position towards its said second position under the urging influence of its said resilient biasing element.

* * * * *